United States Patent [19]

Zwillich

[11] 4,361,369
[45] Nov. 30, 1982

[54] SWITCHGEAR WITH ENCLOSURE

[75] Inventor: Alexander Zwillich, Pittsburgh, Pa.

[73] Assignee: Westinghouse Electric Corp., Pittsburgh, Pa.

[21] Appl. No.: 178,048

[22] Filed: Aug. 14, 1980

[51] Int. Cl.³ .......................... A47B 77/08; E04C 1/10
[52] U.S. Cl. .................................... 312/223; 312/140;
312/257 SK; 312/263; 211/182; 52/588
[58] Field of Search ..... 312/257 R, 257 SK, 257 SM,
312/257 A, 263, 111, 140, 223; 211/182; 52/588

[56] References Cited

U.S. PATENT DOCUMENTS

| 1,462,617 | 7/1923 | Ohnstrand . | |
|---|---|---|---|
| 2,167,525 | 7/1939 | Rosendale | 312/257 SM |
| 3,085,664 | 4/1963 | Adams et al. . | |
| 3,110,535 | 11/1963 | Anderson . | |
| 3,265,419 | 8/1966 | Durnbaugh et al. . | |
| 3,275,394 | 9/1966 | Massinger . | |
| 3,294,276 | 12/1966 | Kemp et al. | 312/257 R |
| 3,297,384 | 1/1967 | Buice | 312/263 |
| 3,353,854 | 11/1967 | Hansen . | |
| 3,479,568 | 11/1969 | Shapiro et al. | 312/223 |
| 3,913,997 | 10/1975 | Pull et al. | 312/223 |
| 3,919,603 | 11/1975 | Salvati et al. | 312/257 SK |
| 4,114,336 | 9/1978 | Bechet et al. | 312/257 SK |
| 4,171,599 | 10/1979 | Lipp | 52/588 |
| 4,192,119 | 3/1980 | Murphy | 52/588 |
| 4,296,982 | 10/1981 | Kullander | 312/257 R |
| 4,296,983 | 10/1981 | Rogers et al. | 312/263 |

FOREIGN PATENT DOCUMENTS

| 76130 | 7/1953 | Denmark | 312/257 R |
|---|---|---|---|
| 1217854 | 5/1960 | France | 312/140 |

Primary Examiner—Victor N. Sakran
Attorney, Agent, or Firm—M. J. Moran

[57] ABSTRACT

Metal clad switchgear apparatus is taught which includes a skeletal arrangement formed from using "fivefold" channel members with eight unitary corner members. Four type "A" corner members are utilized and four type "B" corner members are utilized. The "A" and "B" corner members are formed from utilizing three identical gusset members in any one of two alternate dispositions. The formed corners are self-aligning and self-jigging relative to the channels which interlink them.

13 Claims, 22 Drawing Figures

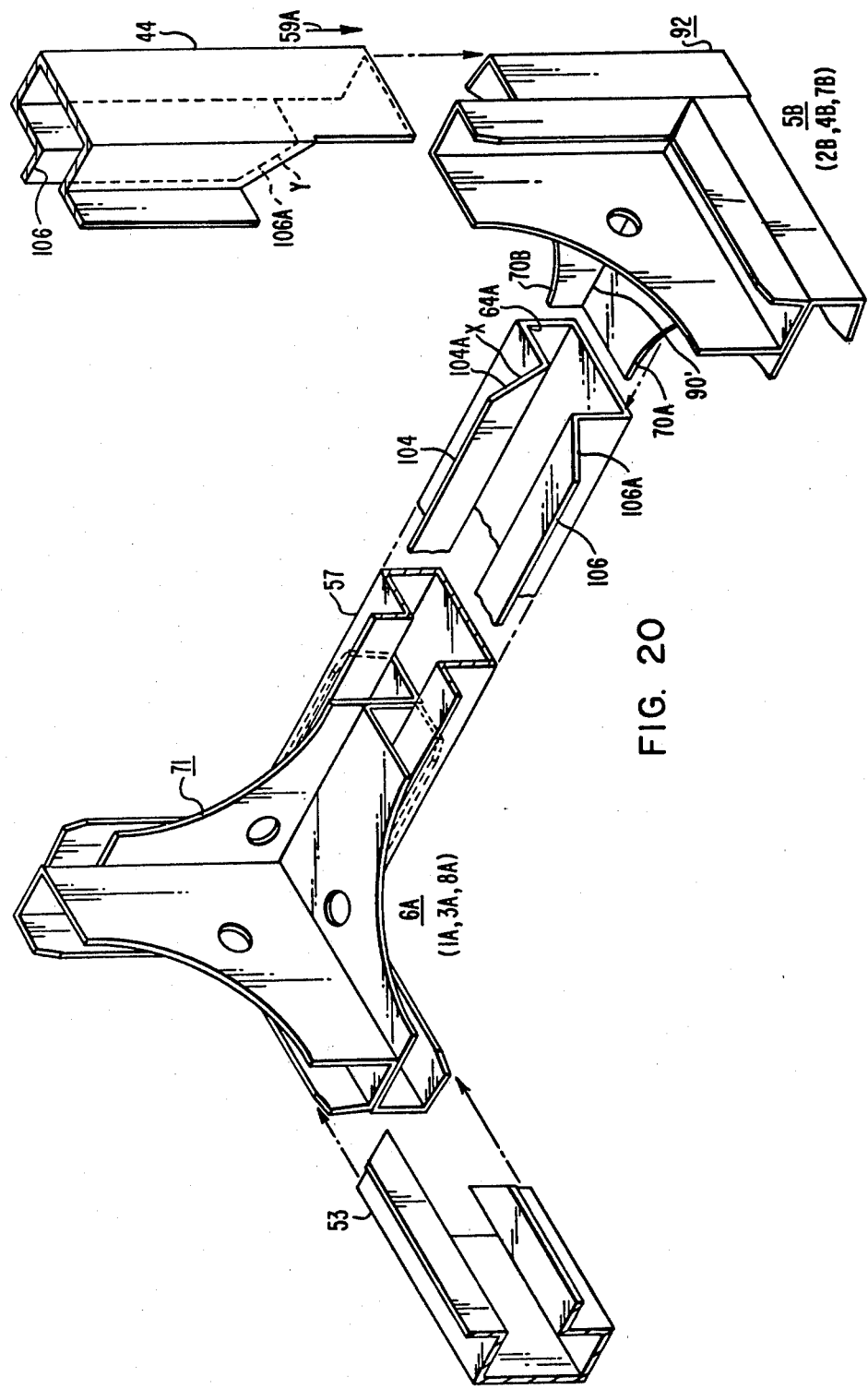

SWITCHGEAR WITH ENCLOSURE

BACKGROUND OF THE INVENTION

The subject matter of this invention relates generally to metal clad switchgear and relates more particularly to metal clad switchgear with integral structural corner assemblies for making metal clad switchgear more useful.

Metal clad or metal enclosed switchgear as the case may be includes electrical circuit apparatus disposed within a metal cabinet in which high voltage electrical conductors are usually present. The metal cabinet is generally grounded so as to provide a surrounding region of zero electrical ground plane for the apparatus and conductors' protection. The electrical integrity of the ground plane or planes must therefore be relatively high. Furthermore, switchgear equipment is usually heavy. Consequently, the metal planes which define the top, rear, sides and back of the cabinet and the structural skeleton member upon which the planes are supported must accommodate stable mechanical loading and acceleration forces. This is even more critical in a situation involving similar vertically disposed switchgear elements where the structural skeleton, as opposed to the floor, must support all of the load of the topmost element. It has been found therefore that the construction of the eight corners of a metal enclosed or metal clad switchgear structural skeleton must assist in maintaining the structural capabilities of the skeleton and in maintaining the electrical integrity of the zero ground planes. Furthermore, for reasons of expense and efficiency the assembly operation should be simple and the form of the corner should be as uniform as possible for all eight corners to reduce the number of parts required for forming the eight corners of the skeleton. In much of the prior art the corner is merely formed by joining three perpendicular skeleton members one to the other without the aid of additional support members at the apex. Examples of such construction are found in the U.S. Pat. No. 3,275,394, entitled "Furnished Brace Construction", issued Sept. 27, 1966, to H. Massinger; U.S. Pat. No. 1,462,617, entitled "Interfitting Corner Construction", issued July 24, 1923, to E. Ohnstrand; U.S. Pat. No. 3,085,664, entitled "Frame Member", issued Aug. 16, 1963, to J. M. Adams et al.; U.S. Pat. No. 3,265,419, entitled "Cabinet Structure", issued Aug. 9, 1966, to J. A. Durnbaugh et al.; and U.S. Pat. No. 4,114,336, entitled "Electrical Switchboard Framework", issued Sept. 19, 1978, to H. L. J. Bechet et al. Furthermore, a slight deviation from the above-mentioned concept is taught in U.S. Pat. No. 3,110,535, entitled "Metal Cabinet Framework and Panel Structure", issued Nov. 12, 1963, to R. Q. Anderson et al. In the latter case a five-bend structure member is taught for convenient jointure with two other such members at a corner with the inclusion of a separate support block in the corner region. The support block in the latter case merely provides a convenient surface against which the other members may be welded or otherwise secured without providing significant separate support. In general, the preceding line of the prior art teaches a relatively simple construction in which welding or bolting of the members one to the other is required. In apparatus such as this no previously established unitary corner member is available upon which the corner may be constructed. In another line of prior art a basic corner member is provided upon which the structural skeleton members may be anchored. Such constructions are found in U.S. Pat. No. 2,167,525, entitled "Cabinet", issued July 25, 1939, to R. W. Rosendale and U.S. Pat. No. 3,919,603, entitled "Switchboard Framework Corner Tie", issued Nov. 11, 1975, to J. G. Salvati et al. In the latter case the corner member is constructed as a single folded sheetmetal member having slightly different configurations in one direction than in the others. Furthermore, the corner is not self-jigging, that is, the channel members must somehow be held in place on the corner member by separate apparatus or by construction personnel and then bolted or welded to the corner member as the case may be. In a further line of prior art the channel members are disposed upon a unitary corner and then a separate gusset is provided for completing the construction. In this case the corner constitutes a single folded sheetmetal piece and the gusset constitutes a separate piece. The latter line is exemplified by U.S. Pat. No. 3,353,854, entitled "Structural Corner Assembly", issued Nov. 21, 1967 to K. M. Hansen. In the latter two lines of prior art the folding operation associated with the construction requires at least two different setup operations because at least two different kinds of unitary corners are required. Furthermore, a separate gusset and tripodal member is required in each case. Finally, none of the members are self-jigging. It would be advantageous if a single member made of folded sheetmetal could be utilized to form all of the corner structures of metal clad switchgear and further included as part of the construction a gusset member and further be self-jigging.

SUMMARY OF THE INVENTION

In accordance with the invention, switchgear apparatus is taught which includes a circuit interrupter for controlling an electrical circuit and metal panels disposed on skeleton supports disposed around the circuit interrupter for assisting in isolating the circuit interrupter from a predetermined region. The skeleton support includes three channel members each of which has an opening in the periphery thereof and each of which is disposed generally perpendicular to the other two at an apex region. There are three generally identical gusset members each of which has two resilient protruding portions thereon which are oriented at 90° relative to each other. Each resilient portion extends through one of the channel member openings in combination with a similar portion from another of the gusset members to thus bear against an internal surface region of the channel member and the similar portion in a state of compression. The channel member itself is resilient and it expands somewhat under the influence of the gusset members retained therein until an equilibrium is attained between the tensile force of the resilient channel member and the compressive force of the abutting gusset members. This aligns the remainder of each gusset member in a disposition which places all three gusset members in a corner arrangement in the apex region relative to the channel members. This apparatus is self-jigging and when formed includes a corner member with gussets. The corner arrangement may be constructed by combining three identical folded sheetmetal members in two different configurations to make all eight corners of the switchgear. Since only one folded member is used, the simplicity of the arrangement is enhanced and the construction cost reduced. Furthermore, the self-jigging characteristic of the arrangement reduces the switchgear cabinet construction complexity, difficuly and cost.

BRIEF DESCRIPTION OF THE DRAWINGS

For a better understanding of the invention reference may be had to the preferred embodiments thereof shown in the accompanying drawings in which:

FIG. 20 shows an orthogonal view of "A" type and "B" type corner assemblies with skeletal channel members interconnected;

DESCRIPTION OF THE PREFERRED EMBODIMENTS

Figure 1:
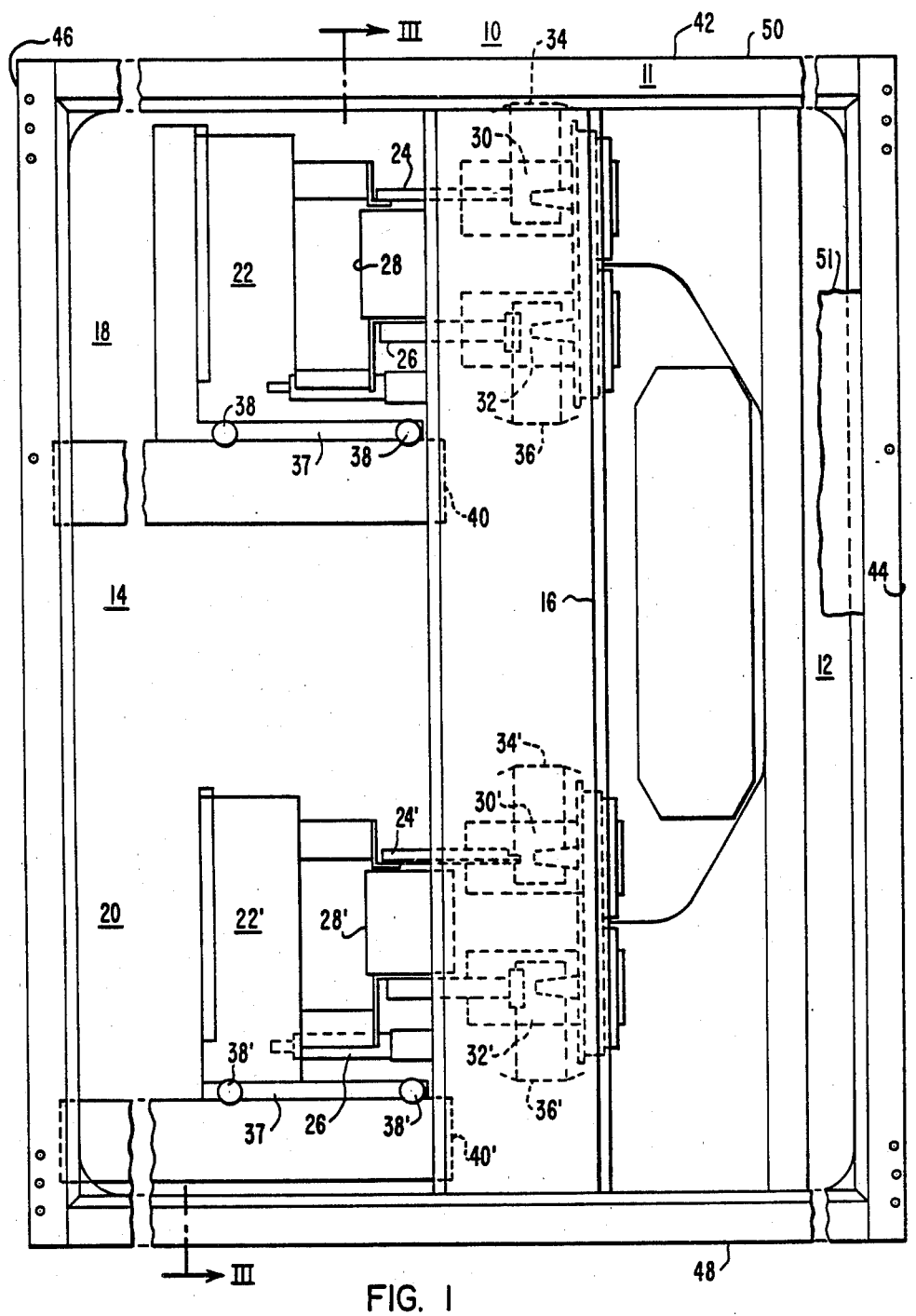
FIG. 1 shows a side elevation partially broken away of a metal clad switchgear cabinet of the kind in which the present invention is utilized.
Figure 2:
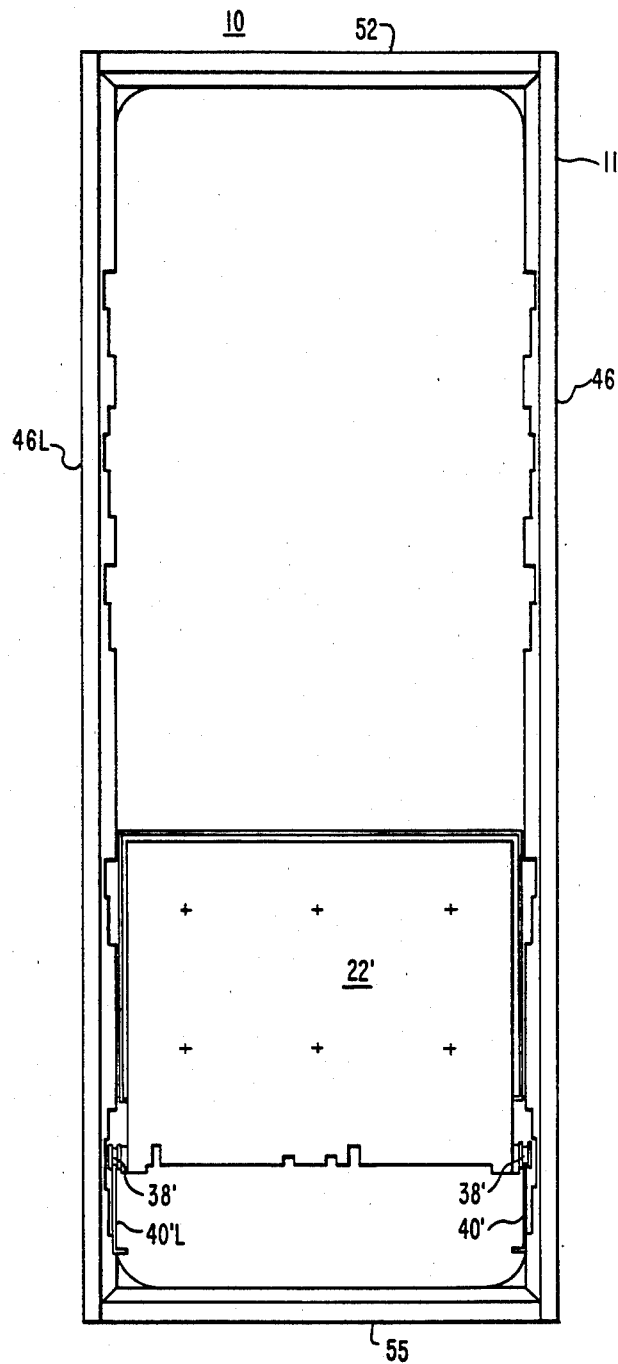
FIG. 2 shows a front view of the apparatus of FIG. 1 with some portions deleted for simplicity of illustration.
Figure 3:
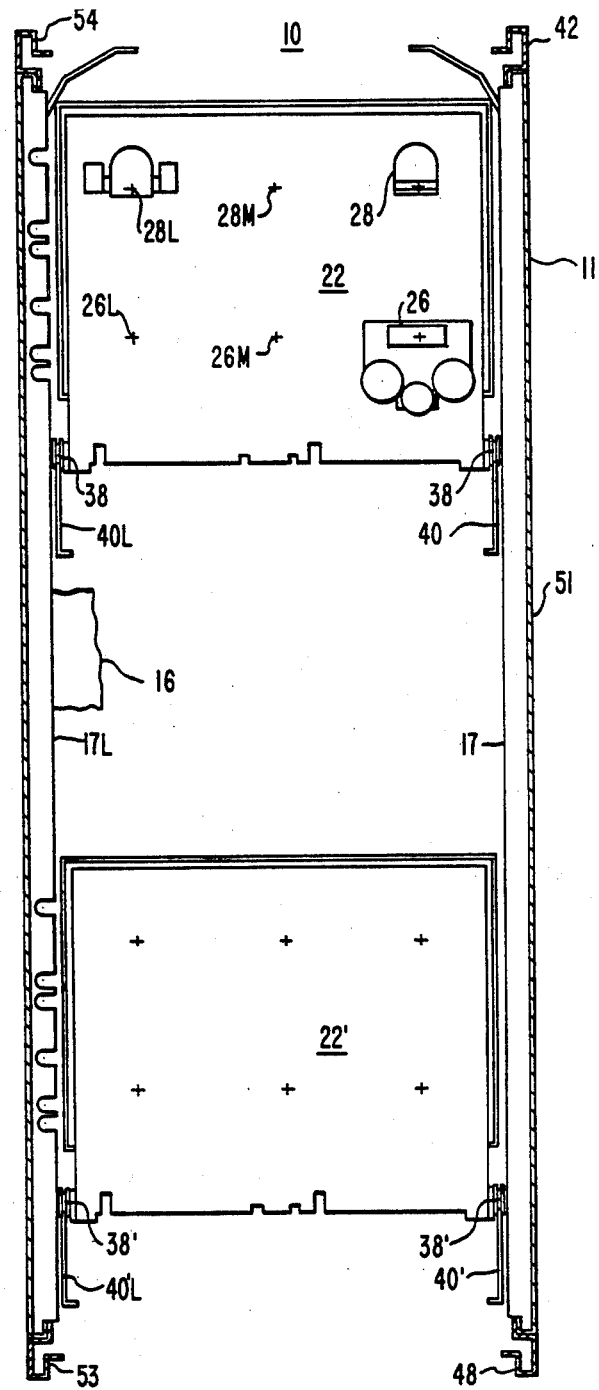
FIG. 3 shows a front sectional elevation of the apparatus of FIG. 1 along the section lines III—III shown therein.

Referring now to the drawings and FIGS. 1, 2 and 3 in particular, a metal-clad switchgear system 10 is shown. Metal clad switchgear system 10 may be of the type which includes three-phase tandem vertically disposed removable vacuum circuit interrupters. The switchgear system 10 may comprise a cabinet 11 in which the apparatus of the switchgear system 10 is disposed. Cabinet 11 may include at the rear or right portion thereof as shown in FIG. 1 a rear compartment 12 and may include at the front or left portion thereof as viewed in FIG. 1 a front compartment 14. Rear compartment 12 and front compartment 14 are separated by an electrically conducting metal plate 16 which forms an electrical grounded electrical plane between the rear compartment 12 and the front compartment 14. Conductive plate 16 may be disposed on convenient brackets 17 and 17L which are closely associated with the sides of the cabinet 11 and which are best shown in FIGS. 1 and 3. The compartment 14 may be further separated vertically into an upper region 18 and a lower region 20, which may be capable of accepting removable vacuum circuit interrupters 22 and 22' respectively or other appropriate electrical apparatus. For purposes of simplicity of illustration, description of the vacuum circuit interrupter apparatus will be made with respect to the upper circuit interrupter 22, it being understood that in this embodiment of the invention the lower circuit interrupter 22' is the same. Consequently, like portions of the lower circuit interrupter 22' with regard to the upper circuit interrupter 22 will be identified with the same reference characters and prime ('). Circuit interrupter 22 may include an upper terminal assembly 24 and a lower terminal assembly 26 between which is disposed a vacuum circuit breaker contact bottle 28. Appropriate operating mechanisms within the circuit interrupter 22 may be utilized to control the opening and closing of the contacts of the vacuum circuit breaker bottle 28. The upper and lower contact assemblies 24 and 26 respectively are connectable in electrically conducting circuit relationship with high voltage terminals 30 and 32 respectively, which are appropriately disposed on the zero ground plane 16 so that the circuit interrupter 22 may control a high voltage electrical circuit or system which is interconnected with the high voltage terminals 30 and 32. The latter system is not shown for purposes of simplicity of illustration. Appropriate pivotal shutters 34 and 36 are disposed in interlinking relationship with the circuit interrupter 22 so that the shutters may be pivoted to a disposition in front of the contacts 30 and 32 respectively when the circuit interrupter 22 is not in a disposition of electrical connection with the latter-mentioned high voltage terminals. Conversely the shutters are disposable in the disposition shown in FIG. 1 for allowing interconnection to be made between contact assembly 24 and high voltage terminal 30 and contact assembly 26 and high voltage terminal 32 when the circuit interrupter 22 is in its "levered in" disposition as is shown in FIG. 1. The circuit interrupter apparatus 22 is disposed upon a footplate or base 37 upon which are disposed wheels 38. Wheels 38 are engageable in flanged rollable disposition with a side rail 40. Consequently, the circuit interrupter 22 may be rolled laterally along the side rail 40 to cause connection or disconnection as is desired of the contact assemblies 24 and 26 to the high voltage terminals 30 and 32 respectively. The circuit interrupter 22 may be completely removed from the low voltage compartment 14 by rolling the assembly 22 to the left and out of the cabinet 11 as shown in FIG. 1. The cabinet 11 may comprise a skeletal arrangement of structural electrically conducting channels. For example, an upper horizontal right channel 42 is provided for interconnection with vertical support channels 44 on the rear and 46 on the front. The latter two vertical support channels are disposed upon a lower horizontal channel member 48, thus forming a rectangular member of the four channel pieces 42, 44, 46 and 48. This arrangement is best shown in FIG. 1. As is best shown in FIG. 2 an upper horizontal front support channel 52 is disposed between the intersection of the channels 42 and 46 on the right and the intersection of a left front vertical support channel 46L and a left horizontal support channel 54 on the left. Likewise, on the bottom a lower horizontal front support channel 55 is disposed between the intersection of the vertical channel 46 and the horizontal channel 48 on the right and the intersection between the vertical channel 46L and horizontal channel 53 on the left.

Figure 17:
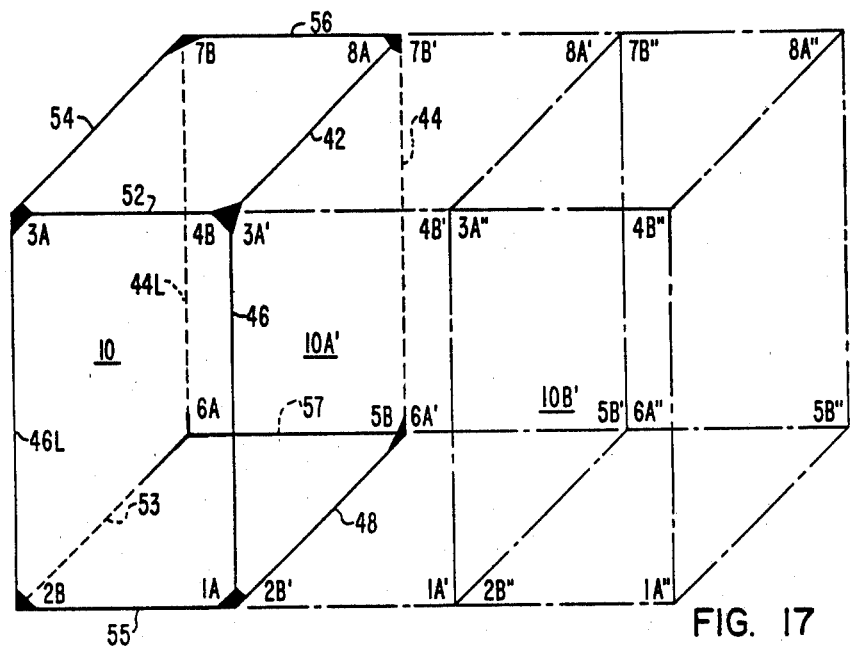
FIG. 17 shows a representative skeletal outline for a 3-bank metal clad circuit interrupter cabinet with appropriate placement of "A" and "B" type corner assemblies.

Reference to FIG. 17 will show a simplified skeletal outline of twelve channel members 42, 44, 46, 48, 52, 53, 54, 55, 56, 44L and 46L.

Referring once again to FIGS. 1–3, the skeletal structure represented by the latter-mentioned members is clad with electrically conducting plate material, a portion of which is shown at 51 in FIG. 1 for example. This plate material is utilized to forms a zero ground plane around the surfaces of the cubical volume represented by the twelve skeletal members for safety.

Referring specifically to FIG. 3 the three-phase arrangement of the upper circuit interrupter 22 is shown in a simplified form for illustration. In particular on the right as viewed in FIG. 3 are the terminals 26 and 28 which represent one phase of the three phase system. In the center are regions where terminals 26M and 28M are disposed to represent the second phase of the three phase system and on the left as viewed in FIG. 3 are regions where the terminals 26L and 28L are disposed to represent the last phase of the three phase system. The previously described skeletal channel members are best shown in cross section in FIG. 3 at 42, 48, 53 and 54. These skeletal members, the geometry of which will be described more fully with respect to FIG. 18, comprise 5 right angle bends and therefore are called "five-bend" channel members. The channel members as formed in the five-bend arrangement represent the significant structural strength and support capabilities which are usually necessary for carrying the static mechanical load of the metal cladding 51, the internal vertical ground plane member 16, the weight of the permanently disposed electrical apparatus such as the contacts 30 and 32 of FIG. 1, for example, and the weight of the movable circuit interrupter apparatus 22 and 22', for example. Dynamic acceleration forces must also be carried. As was mentioned previously the twelve channel members are joined with each other to form eight corners. The corner construction must be such as to enhance the support capabilities of the resultant structural members.

Figure 4:
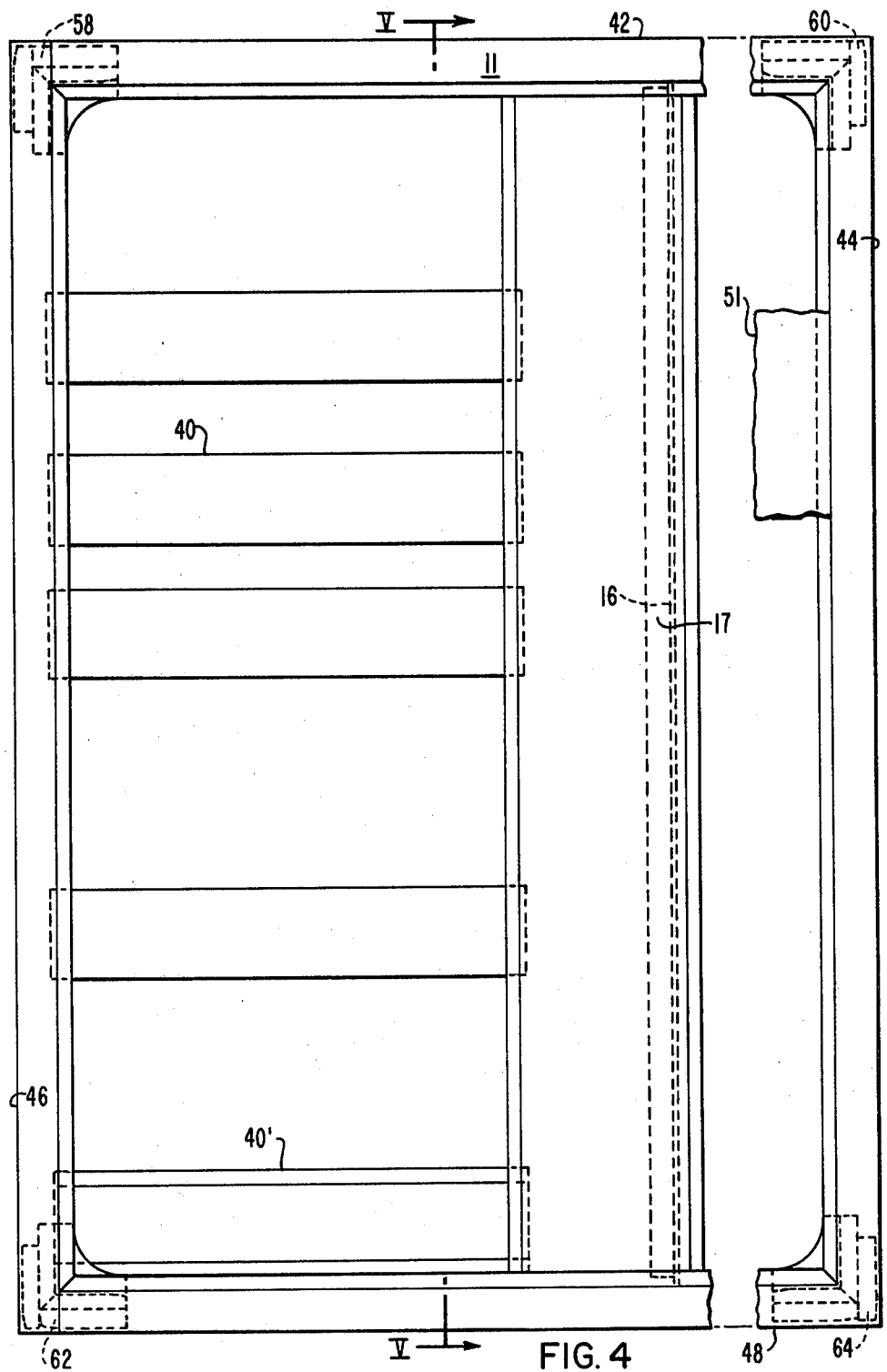
FIG. 4 shows a side elevation similar to that shown in FIG. 1 but with emphasis on the cabinet skeleton and corner construction.
Figure 5:
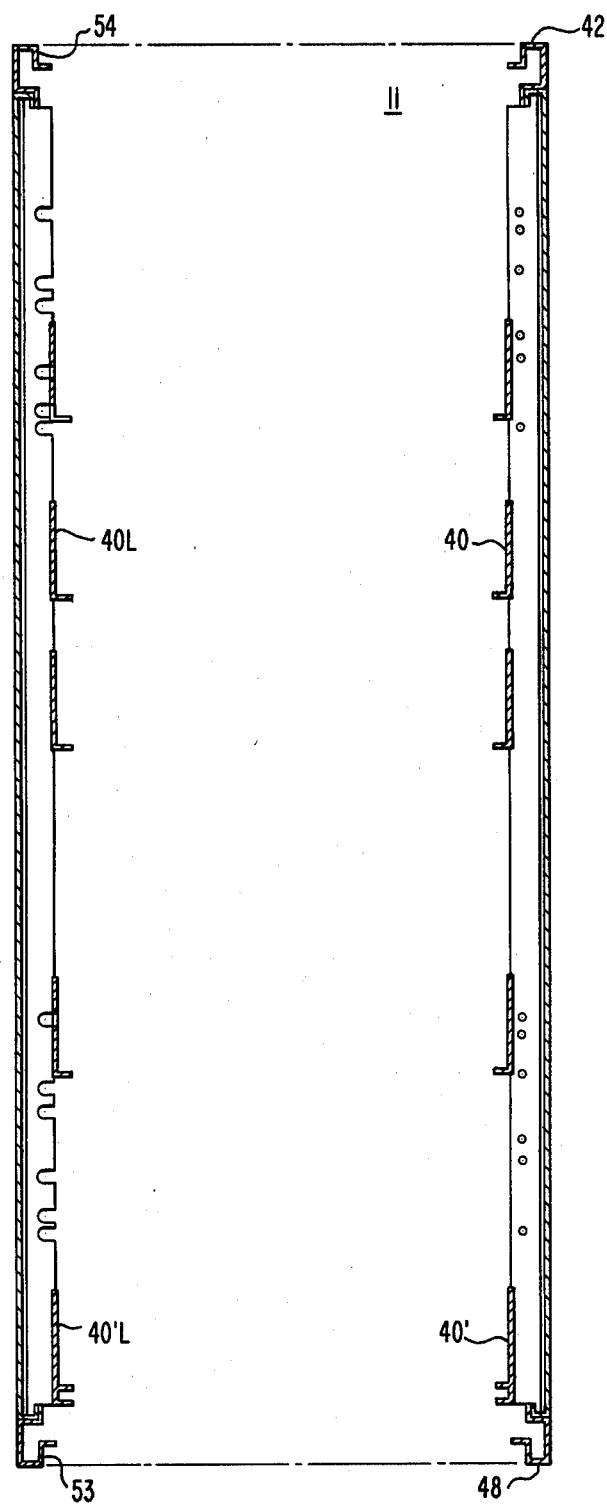
FIG. 5 shows a front view of the apparatus of FIG. 4 along the section lines V—V shown therein.
Figure 6:
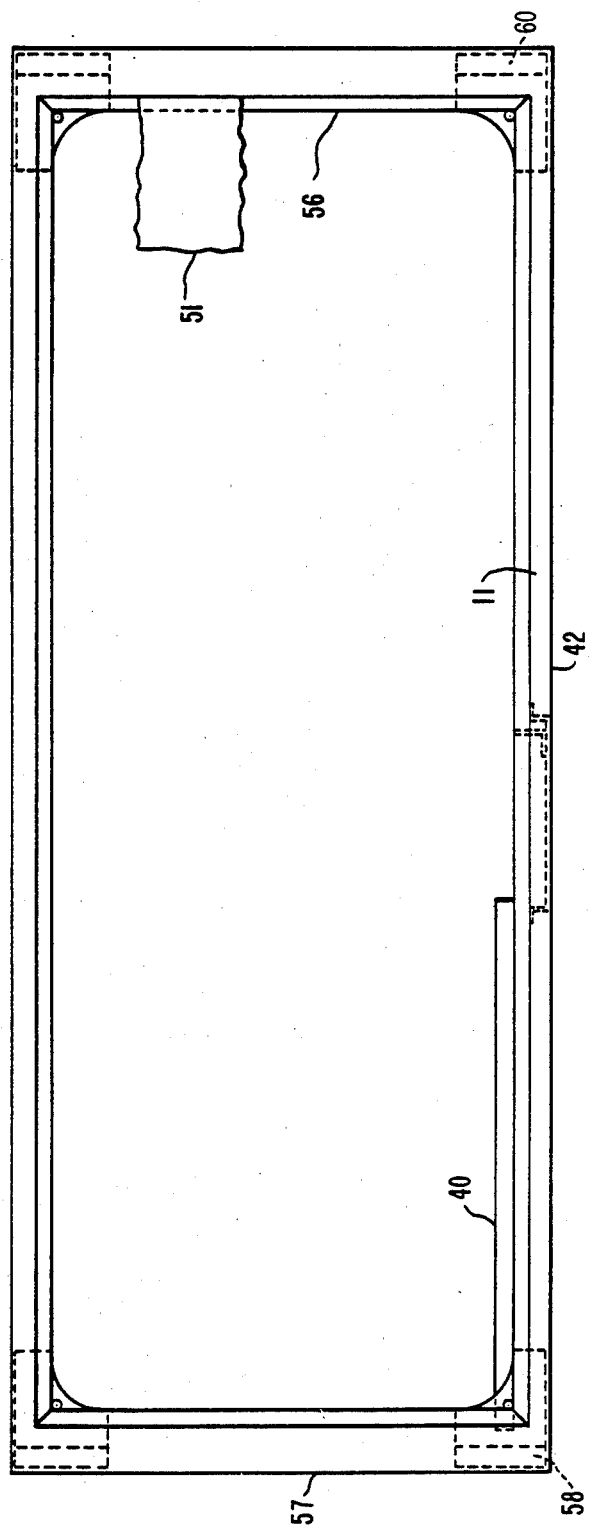
FIG. 6 shows a partial top view of the apparatus of FIG. 4 with emphasis on corner construction.
Figure 7:
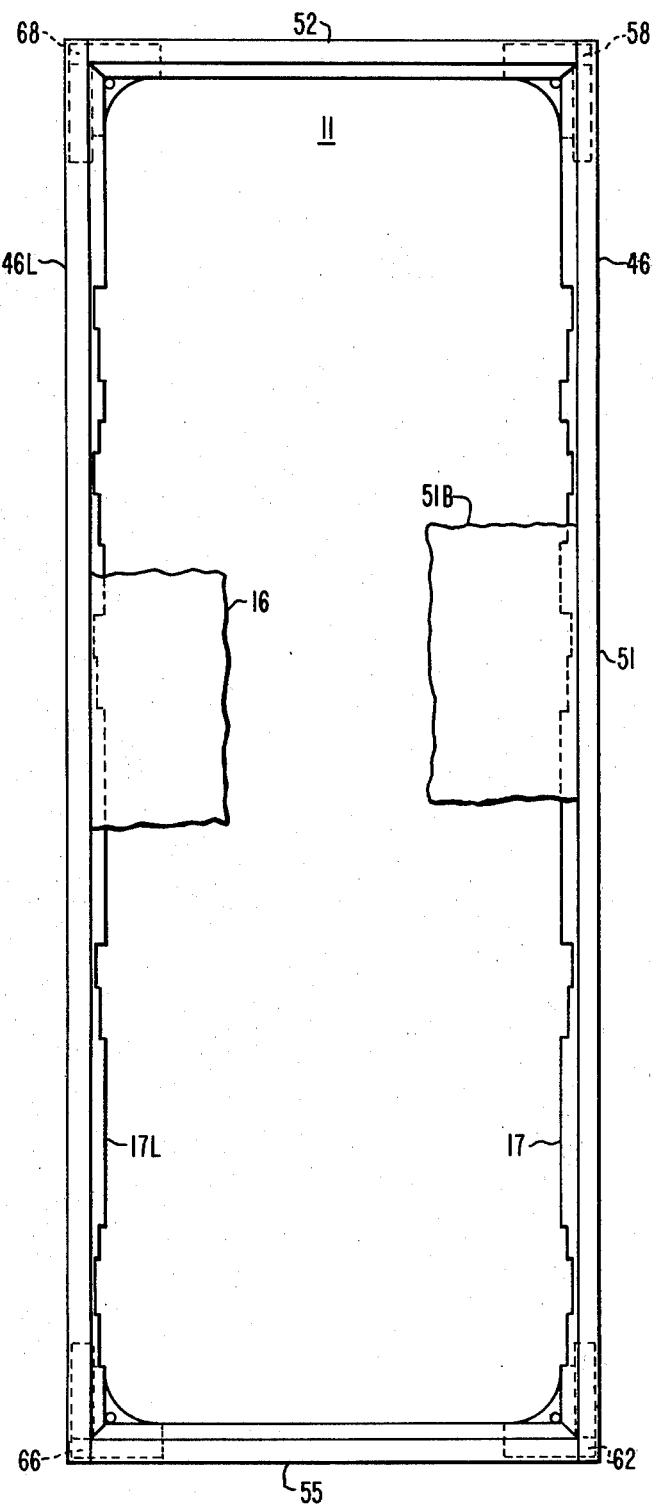
FIG. 7 shows a front view of the apparatus of FIG. 4.

Referring now to FIGS. 4–7, the skeletal arrangement shown in FIGS. 1–3 is depicted again with emphasis on corner construction and with electrical circuit apparatus deleted for purposes of simplicity of illustration. FIG. 4 generally corresponds to FIG. 1, FIG. 7 generally corresponds to FIG. 2, FIG. 5 generally corresponds to FIG. 3 and FIG. 6 is added to show a partial top view of the skeletal arrangement of the cabinet 11. The construction features of the corner members will be described in more detail hereinafter with regard to other figures. It can be seen, however, with reference to FIGS. 4, 6 and 7, for example, that a unitary corner member 60 is provided for joining the mutually perpendicular channel members 42, 44 and 56, for example, to form an upper right rear corner assembly for the skeletal arrangement of the cabinet 11. Similarly, a unitary corner member 58 is utilized to join the mutually perpendicular skeletal members 42, 46 and 52 in the upper front right corner of the skeletal members. Likewise, a corner member 62 is utilized to join the mutually perpendicular members 46, 48 and 55 in the lower right front portion of the skeletal arrangement and a corner member 64 is utilized to join the mutually perpendicular skeletal members 44, 48 and 57 (shown best in FIG. 17 and FIG. 19). In the preferred embodiment of the invention corner members 60, 62 and 68 (shown best in FIG. 4 and FIG. 7) may be identical, whereas corner members 64 and 66 may be identical. In general, the eight corners formed by the twelve channel members of the skeletal arrangement are formed from two different constructions; one for comprising one set of corners and one for comprising another set of corners. Generally, however, the basic building block from which each corner is constructed is identical. It is only the arrangement of the basic building blocks into the corner shape that is different.

Figure 9:
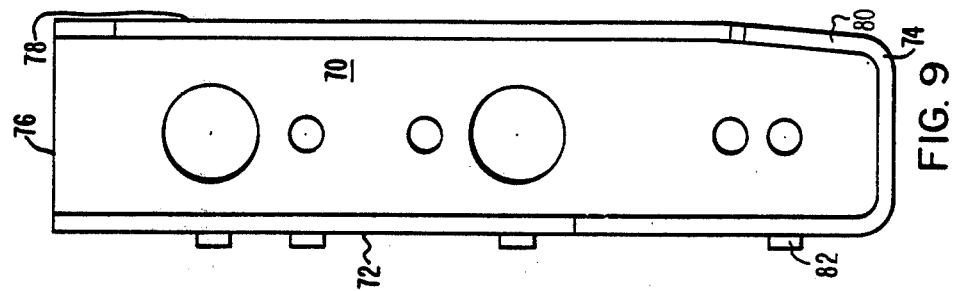
FIG. 9 shows one side elevation of the apparatus of FIG. 8.
Figure 8:
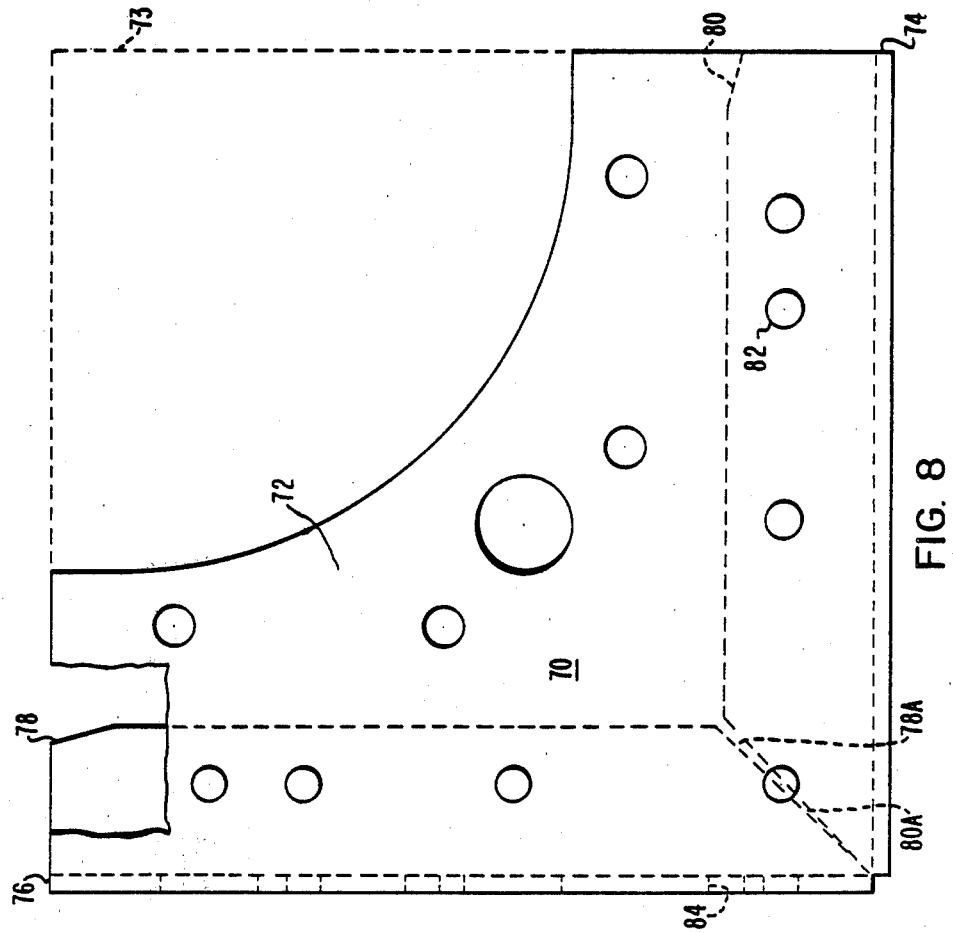
FIG. 8 shows a front elevation of a corner assembly member from which a corner assembly is constructed.
Figure 10:
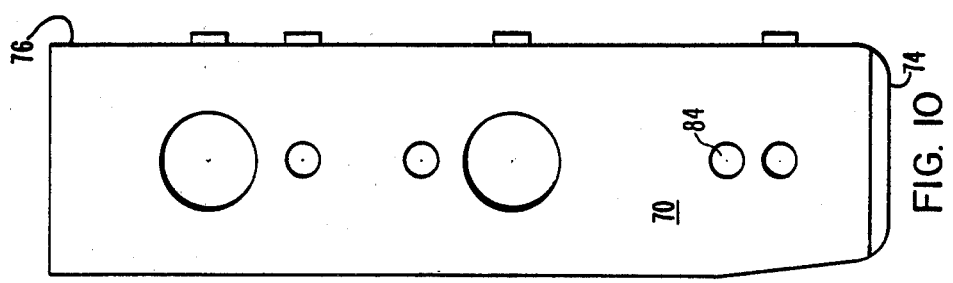
FIG. 10 shows the opposite side elevation of the apparatus of FIG. 8.

Referring now to FIGS. 8, 9 and 10, the basic component part or building block 70 for the previously described corner assemblies is shown. Three of these identical component parts 70 may be utilized in configurations shown and described hereinafter with respect to FIGS. 11–16, for example, to form integral completed corner assemblies such as assemblies 58 and 60, shown in FIG. 4, for example. The basic component or corner assembly member or gusset member 70 may have a flat generally rectangular planar surface 72 from one corner of which may be cut a circle sector 73. Portion 73 as best shown in FIG. 8. Circle sector 73 is removed from the rectangular portion to provide clearance in certain circumstances for apparatus which may come close to an assembled corner member during insertion or removal from cabinet 11. The removal of the circle sector 73 does not substantially alter the physical strength and load bearing capabilities of the remaining planar member 72. Generally, extending perpendicularly from one of the two edges opposite the circle sector formed by removal of the circle sector 73 is a first side portion 74 and extending perpendicularly from the other edge is a similar side portion 76, the planes of which are at right angles one to the other. Extending generally perpendicularly from member 76 and oriented in a plane generally parallel to the plane of member 72 is a lip portion 78. In a like manner extending generally perpendicularly from edge member 74 and being generally parallel to the plane of member 72 is a second lip portion 80. The combination of members 74 and 76 and the combination of members 78 and 80 are generally resilient. Lip portions 78 and 80 are generally parallel one to the other and overlay the region of the member 72. Examination of FIG. 9 will show that members 80 and 78, though being generally perpendicular to members 74 and 76 respectively and though being generally parallel to member 72 are not completely perpendicular or parallel thereto, respectively. Member 80 and member 78 may be inclined at some small angle relative to members 74 and 76 respectively, which small angle may be 5 degrees, for example. This allows the members 80 and 78 to protrude outwardly somewhat from the main body of the member 70. There may be also provided stub portions 82 on appropriate surfaces of the member 70 and corresponding complementary openings or hole portions 84 on other portions of the member 70, it being recognized that stub portions 82 in one member 70 may align with and protrude into complementary hole portions 84 in another member 70 in the completed corner assembly, thus providing an interlocking characteristic between the assembled members. This latter characteristic may be useful to prevent surface-to-surface lateral sliding of the members, it being envisioned that welding or other securing techniques may be utilized to complete the construction of a corner member as will be described hereinafter.

Figure 13:
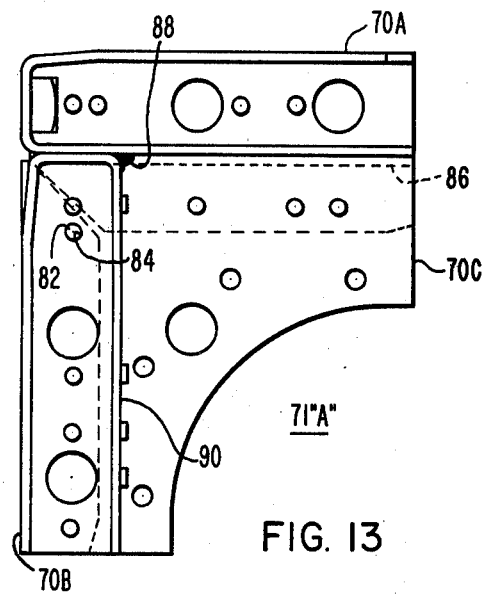
FIG. 13 shows a top view of the assembly of FIG. 11.
Figure 11:
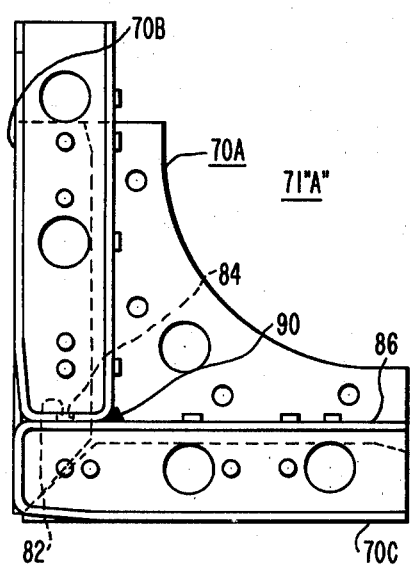
FIG. 11 shows a front view of an assembled "A" type corner assembly.
Figure 12:
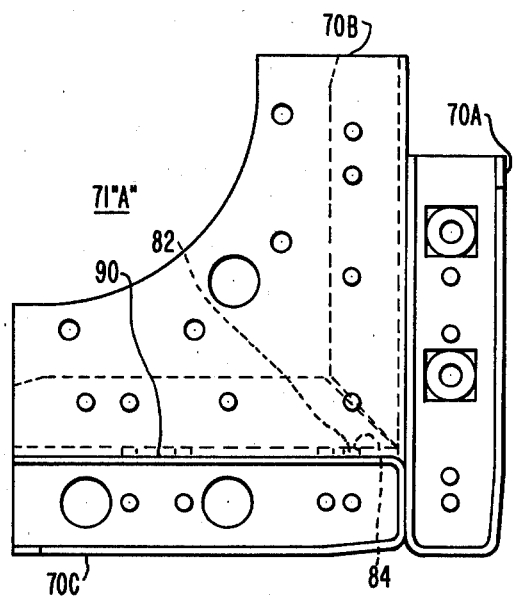
FIG. 12 shows a side view of the assembly of FIG. 11.
Figure 16:
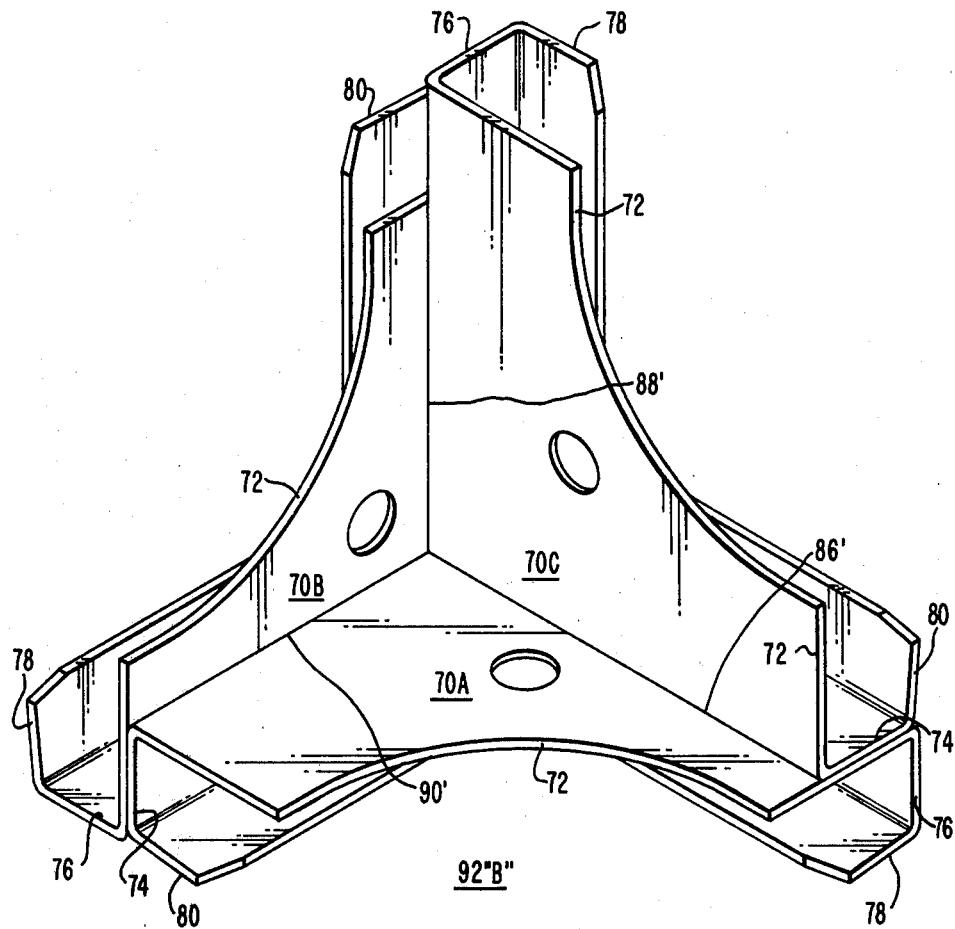
FIG. 16 shows an orthogonal assembled view of a "B" type corner assembly.

Referring now to FIGS. 11, 12 and 13, a completed corner member utilizing three appropriately joined gusset members such as gusset member 70 shown in FIGS. 8-10 is shown. In this case each identical gusset member is identified separately as gusset member 70A, 70B and 70C. The corner assembly 71 thus formed may be designated arbitrarily the "A" corner assembly, it being understood that a "B" corner assembly may also be formed from the same members 70 when aligned in slightly different configuration than is shown in FIGS. 11, 12 and 13. Reference to FIG. 16 to be described hereinafter will show a "B" type assembly.

Figure 14:
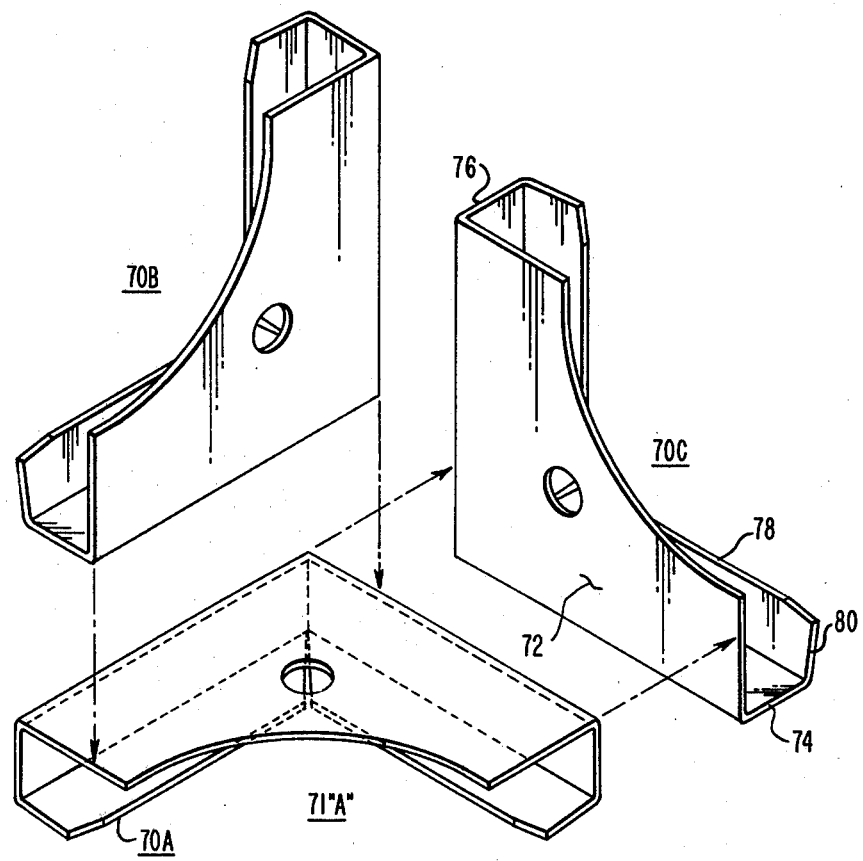
FIG. 14 shows an exploded orthogonal view of the type "A" corner assembly of FIGS. 11, 12 and 13.
Figure 15:
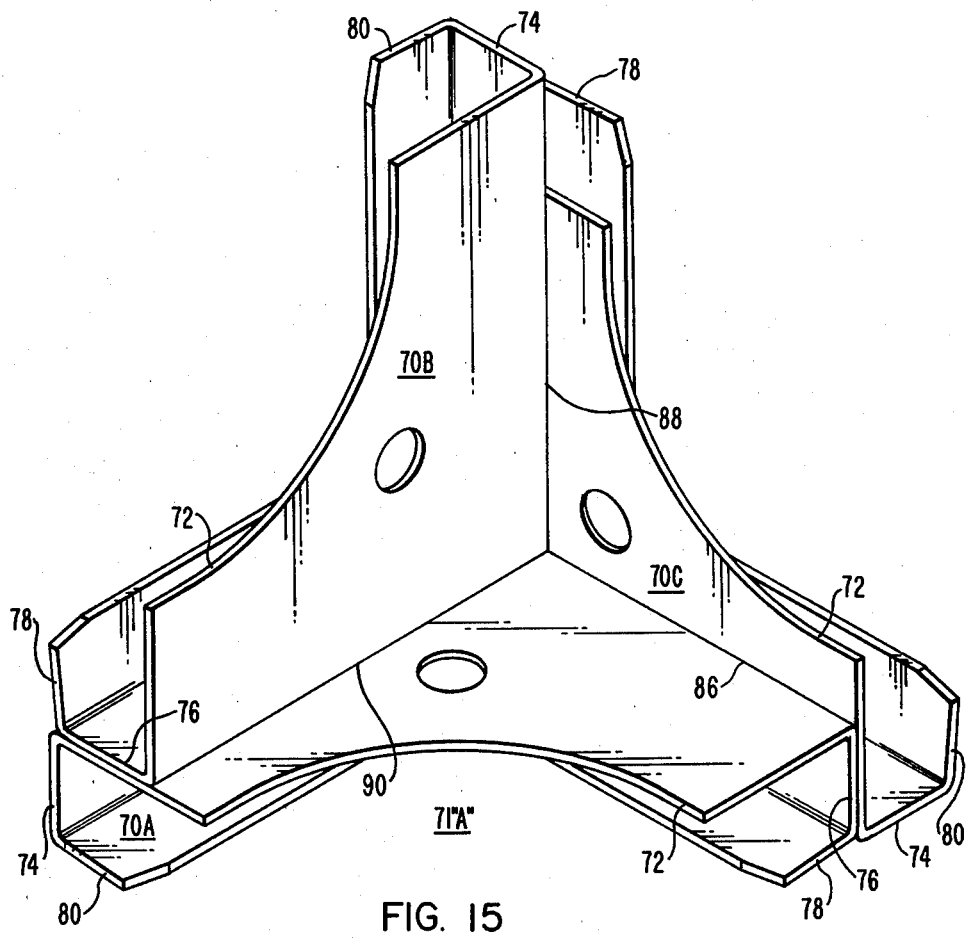
FIG. 15 shows the corner assembly of FIG. 14 in its assembled disposition.

Referring now to FIGS. 14 and 15, as well as FIGS. 11-13, it can be seen that the three gusset members 70A, 70B and 70C are oriented mutually perpendicular one to the other to form a completed type "A" corner assembly 71 type "A". For purposes of illustration, picture member 70A disposed in a horizontal position such that planar surface 72 is parallel to the flat horizontal surface upon which it resides. In this case surface 72 is spaced above the surface upon which members 80 and 78 rest. Member 70B is disposed adjacent surface 74 of member 70A such that surface 76 of member 70B rests upon surface 72 of member 70A. This orients surface 72 of member 70B perpendicular to surface 72 of member 70A. The foregoing arrangement is such that member 78 extends outwardly slightly from the continuation of the vertical plane of surface 74 of member 70A. Furthermore, member 72 of member 70B is disposed inwardly of the latter arrangement. To this perpendicular arrangement, member 70C is added in a disposition of mutual perpendicularity to both members 70A and 70B. In this case surface 74 of member 70C resides generally on the same surface that members 80 and 78 of member 70A reside. Consequently, surface 72 of member 70C abuts against surface 76 of member 70A. Likewise, surface 72 of member 70C abuts against surface 74 of member 70B. It will be noted that member 70C does not extend vertically as high as member 70B because member 70B resides upon member 70A while member 70C resides beside member 70A. Though not shown, a number of complementary abutments 82 and openings 84 referred to with regard to FIGS. 8, 9 and 10 interlock one with the other between members 70A, 70B and 70C to prevent sliding between the abutting surfaces of the three members. To complete the assembly, welds may be placed at the interface corners 86, 88 and 90 as best shown in FIG. 15. Furthermore, welds may be added to external portions of the member 71 shown in FIG. 15 at the external portion of the interface between surface 72 and surface 76 of member 70A and member 70B, respectively; at the outer extension of the interface between surface 80 and surface 76 between members 70B and 70C, respectively; and at the outer extension of the interface between surface 78 and surface 74 of members 70A and 70C, respectively. The thusly formed "A" type corner assembly represents a unitary corner to which mutually perpendicular channel members may be secured in a self-jigging fashion in a manner to be described hereinafter for completing a relatively strong simple skeletal structure for metal clad switchgear.

Referring now to FIG. 16 a "B" type corner member 92 which somewhat resembles the "A" type corner member 71 of FIG. 15, for example, is shown. It is to be recognized from the outset that three gusset members 70A, 70B and 70C are utilized in combination to form the "B" type corner member 92. The latter-mentioned gusset members are essentially the same as the gusset members 70A, 70B and 70C of the "A" type gusset member 71 shown in FIG. 15. It is merely the orientation or arrangement of the members relative to one another which distinguishes the "B" type corner member from the "A" type corner member. As a starting point it should be recognized that gusset member 70A for the "B" type corner assembly 92 is disposed essentially the same as gusset member 70A of the "A" type assembly 71. The essential difference then between the "B" type corner assembly and the "A" type corner assembly lies in the arrangement of the gusset members 70B and 70C in the two assemblies. By review of FIG. 15 it can be seen that for the "A" assembly the 70B gusset member is disposed essentially on top of the 70A gusset member and the 70C gusset member is disposed beside the 70A member. On the other hand, member 70B as is shown in FIG. 16 for the "B" assembly is disposed beside the gusset member 70A and member 70C is disposed on top of the 70A member. To be more specific, inwardly disposed surface 72 of gusset member 70B of the "B" type corner assembly 92 vertically abuts surface 74 of member 70A. On the other hand, surface 74 of gusset member 70C horizontally abuts surface 72 of gusset member 70A. Consequently, surface 76 of member 70C vertically abuts surface 72 of member 70B. Thus constructed, intersection regions 86', 88' and 90' similar to intersection regions 86, 88 and 90 for the "A" type corner assembly 71 are formed. As was the case previously, abutments 82 may make complementary engagement with holes 84 in appropriate places to enhance the interlocking characteristics of the separate gusset members when formed into a corner. Welding or other appropriate generally permanently affixing technique may be applied at appropriate places similar to that which was described with respect to the "A" type corner assembly 71 shown in FIG. 15.

Referring now to FIG. 17, a greatly simplified orthogonal schematic diagram of a skeleton member for a switchgear cabinet such as cabinet 10 shown in FIGS. 1-7 is provided. Furthermore, similar skeletal members are provided to form a non-limiting 3-bay side-by-side cabinet arrangement which additionally includes the cabinets 10A' and 10B'. Referring first to the heavily outlined leftmost skeletal assembly identified as 10 to show the similarity between that cabinet member and the one shown in FIGS. 1-7 is discussed. It will be noted that the channel members 42, 44, 44L, 46, 46L, 48, 52, 53, 54, 55, 56 and 57 correspond to channel members described previously with respect to FIGS. 1-7. Furthermore, the eight corners are designated: 1A on the lower right front, 2B on the lower left front, 3A on the upper left front, 4B on the upper right front, 5B on the lower right rear, 6A on the lower left rear, 7B on the upper left rear and 8A on the upper right rear 8A. The "A" and "B" designations are utilized to identify the "A" and "B" type corner assemblies 71 and 92, respectively, shown in and described with respect to FIGS. 15 and 16 respectively. It is to be noted that the similar corner assemblies are diagonally opposite each other. For example, an "A" type assembly is in the lower right front corner, upper left front corner, lower left rear corner, and upper right rear corner. Conversely, a "B" type assembly is in the lower left front corner, the upper right front corner, the upper left rear corner and the lower right rear corner. By extending the principles described with respect to the skeletal arrangement shown with regard to the cabinet 10 to the right, two other cabinet skeletal sections 10A' and 10B' are shown. Utilizing the same designations but with the utilization of primes (') and double primes (") it can be seen that the cabinets are relatively similar, that is for example, in cabinet 10A' and cabinet 10B' the lower right corner in each case is an "A" type assembly designated 1A' and 1A", respectively. On the other hand the upper left rear corner is a "B" type assembly designated 7B' and 7B", respectively. The designations described herein are essentially the same as the designations described with respect to the cabinet 10 on the left of FIG. 17. It is interesting to note that in the region between cabinet 10 and 10A' and cabinet 10A' and 10B' internal electrically conducting planes are present. These planes essentially represent sides of the siwtchgear cabinets. By reference to FIGS. 20 and 21 to be discussed and described hereinafter it will be noted that the metal cladding on an internal surface may be differently arranged from the metal cladding on an external surface.

Figure 19:
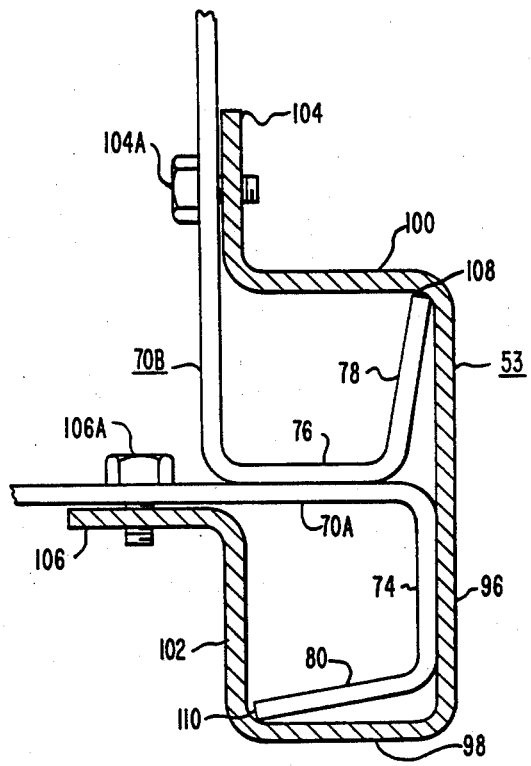
FIG. 19 shows a cross-sectional view of the "A" type corner assembly of FIG. 18 looking opposite the direction 59.
Figure 18:
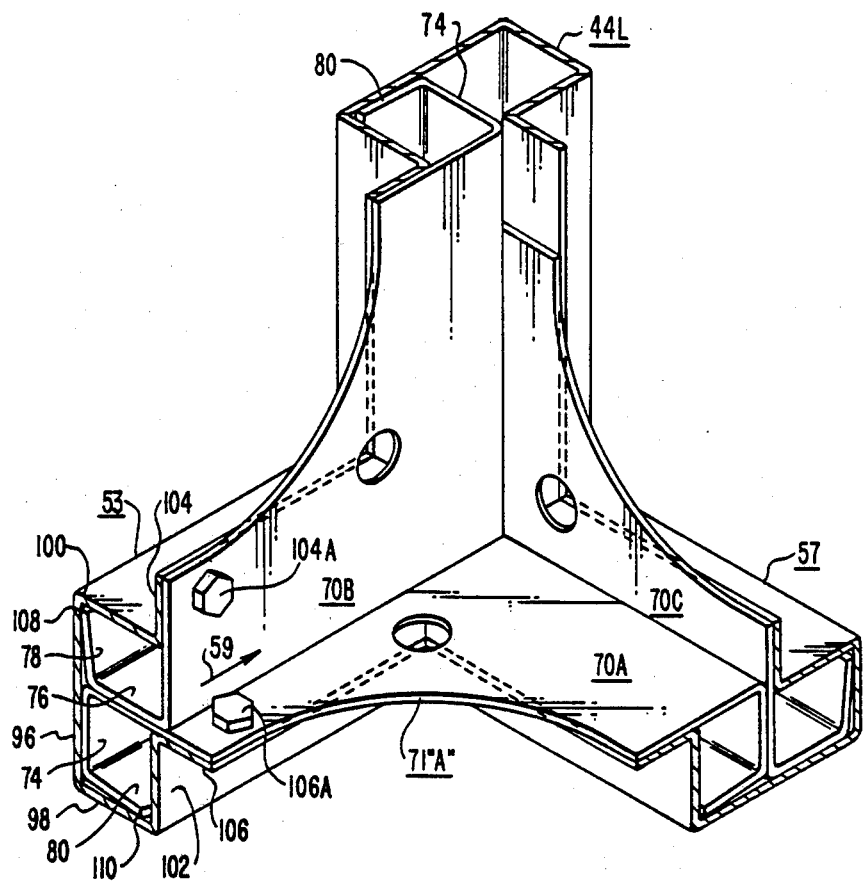
FIG. 18 shows an orthogonal assembled view of an "A" type corner assembly with broken away skeletal channel members for a switchgear cabinet in place.

Referring now to FIG. 18 and FIG. 19, an "A" type corner assembly 71 is shown on which three channel members 53, 57 and 44L are fixedly disposed in a disposition of mutual perpendicularity. The corner assembly 71 of FIG. 18 is illustrative of corner 6A shown in FIG. 17, that is, corner assembly 71 of FIG. 18 is illustrative of a lower rear left corner. Although channel members 44L and 57 are not shown in FIGS. 1-7, channel member 53 is shown in FIGS. 3 and 5, for example. All channel members 53, 57 and 44L have the same general configuration and may be identified by the designation "five-fold" channel member. Channel member 53, for example, has in cross section: a relatively long side member 96 from which perpendicularly protrude in the same direction and in parallel disposition from either end thereof relatively shorter top and bottom sections 100 and 98. Sections 98 and 100 terminate in perpendicularly oriented upwardly extending (as viewed in FIG. 18) parallel in-line sections 104 and 102. Sections 104 and 102 are generally parallel to the previously described section 96. Section 102 terminates in a perpendicularly lip 106 which extends away therefrom in a direction opposite from the side thereof which is associated with section 96. Furthermore, section 106 is generally parallel to sections 98 and 100. Consequently, it can be seen that there are 5 folds or bends formed by the intersection of perpendicular members, hence the name "five-fold" members. A first fold or bend exists at the intersection of the planes of members 100 and 104. A second fold or bend exists at the intersections of planes 100 and 96. A third fold exists at the intersections of planes 96 and 98. A fourth fold or bend exists at the intersections of the planes 98 and 102 and the fifth or last fold exists at the intersections of the planes 102 and 106. The cross-sectional orientation of channel members 57 and 44L is generally the same as that shown with respect to channel 53. It can be seen therefore that the channel member 53 therefore has an opening in the periphery thereof between members 102 and 104. Furthermore, in the preferred embodiment of the invention as best exemplified in FIGS. 1-7 and FIG. 17, the channel member 53 tends to be elongated. The channel member 53 of course forms a key part of the skeleton support as described previously with respect to FIGS. 1-7 and 17. The disposition of the affixed gusset members 70A, 70B and 70C as constructed to form an "A" type corner 71 with regard to the channel members 53, 57 and 44L, in a manner which will be described hereinafter may form a support member for any type of skeleton or cabinet construction. In the preferred embodiment of the invention, but not limited thereto, the aforementioned members form an integral part of a switchgear system 10. Specifically, it forms part of a metal clad switchgear cabinet in which the channel members 53, 57 and 44L form an important part of the skeleton support structure therefor. It can be seen that even though gusset members 70A and 70B, for example, are affixed to one another in a manner which was described previously, a single modified gusset member 70A, for example, having a resilient portion such as may be represented by the combination of modified planes or surfaces of members 76 and 78 when extended through the previously described opening in the channel member 53 will act to align the remainder of the gusset member 70A in a predetermined disposition relative to the channel member 53. However, if two affixed gusset members 70A and 70B are arranged in the manner described previously and shown in FIG. 18 so that each has a resilient protruding portion, as an example, represented by the combination of surfaces 76 and 78 with respect to member 70B and surfaces 74 and 80 with respect to member 70A and if the dimensions of the latter mentioned surfaces are correct relative to the internal dimensions of the channel member 53, the effect will be that the resilient members would bear in a state of compression against internal surface regions of the channel member 53 in such a way as to align the remainder of each gusset member 70A and 70B in a predetermined disposition relative to the channel member 53. The five-bend member 53 is itself somewhat resilient. Consequently, the abutted members 70B and 70A as best shown in FIG. 19 when placed within the channel opening of the channel 53 cause the channel member 53 to distort somewhat due to its inherent resilience. The shape of the channel member 53 will distort until the net resilience between the channel member 53 and the combined members 70A and 70B reach equilibrium. By inserting and tightening screws 104A and 106A in members 70B-104 and 70A-106 respectively the channel member 53 is caused to clamp the edges 108 and 110 of the members 70A and 70B thus providing the final step in securing the gusset members within the channel members in a tightly gripping arrangement. The screws 104A and 106A which are shown in only two places of FIG. 18 for purposes of convenience of illustration also act to secure the gusset members 70B and 70A, respectively, directly in addition to the clamping action described previously. Generally, this means that the distance between the outer upper edge of the slightly canted member 78 and the outer edge of the slightly canted member 80 is slightly larger than the distance between the bend or fold represented by the intersection of surfaces 96 and 104 and the bend or fold represented by the intersection of the surfaces 98 and 102 of channel 53. The slightly canted aspect of the members 78 and 80 relative to members 76 and 74, for example, contribute to this characteristic. This interrelationship of the channel member 53, for example, and the combination of the gusset members 70A and 70B, for example, provides a significant self-aligning and self-jigging characteristic to the entire assembly. That is to say, channel member 53 may be joined to the combination of the members 70A and 70B by forcing the channel member 53 onto the corner in a direction indicated by the arrow 59 so that the resilient corner members 70A and 70B are slightly compressed between the regions 108 and 110. The channel member 53 is then completely assembled on the corner by continued driving of the channel member 53 in the direction 59. When the channel member 53 has been completely driven as far as desired in the direction 59 and when other channel members 57 and 94 have also been appropriately driven onto the corner assembly, it will be noted that the channel members 53, 57 and 44L will have become automatically properly aligned relative to the corner member 71 and no further fastening between the members is needed except for the purpose of completing the construction. That is to say, it is not necessary to temporarily fasten one channel member to the gussets as other channel members are being installed, because as each channel member is installed on the corner it is held in place by the reaction forces due to compression of the corner elements. It is envisioned that in some embodiments of the invention no further fastening is needed at this point. That is to say, the compressive characteristic of the resilient members of the corner member 71 acting against internal surfaces of the channel member 53 is sufficient to permanently affix the channel members 53, 57 and 44L to the corner member 71. When the corner member 71 of FIG. 18 has been completely assembled, it can be seen that there are three channel members, each of which has an opening in the periphery thereof, and each of which is disposed mutually perpendicular to the other two to form an apex region. There are three generally identical gusset members 70A, 70B and 70C, each of which has two resilient portions (a combination of surfaces 76 and 78 and a combination of surfaces 74 and 80 on gusset member 70B, for example). The gusset member are oriented 90° relative to each other, that is, resilient portion 76-78 is offset 90° relative to resilient portion 74-80. Each of the resilient portions extends through one of the openings in combination with a similar portion from another of the gusset members, as an example, the combination of resilient portion 76-78 of gusset member 70B with resilient portion 74-80 of gusset member 70A in the apex region, bears against an internal surface region, as an example, at 108 and 110 of the channel member 53 for example, and against each other, as an example, surface 76 of member 70B bears against surface 72 of member 78. This aligns the remainder of each of the gusset members 70A, 70B and 70C, for example, in a disposition which places all three gusset members in a corner arrangement in the apex region relative to the channel members.

Referring now to FIG. 20 there is shown the corner assembly 71 of FIG. 18 (with channel member 44L missing for purposes of simplicity of illustration) and a second corner member 92. As was mentioned previously, corner member 71 may represent corner 6A as shown in FIG. 17. It may also represent corner 1A, corner 3A or corner 8A. Correspondingly, corner member 92 may represent corner 5B as shown in FIG. 17. Also, it may represent corners 2B, 4B or 7B, respectively. By reference once again to FIG. 17, the heavily darkened portion in the lower rear of the skeleton of system 10 represents that part of the skeletal assembly shown in FIG. 20. The interaction between corner 71 and corner 92 in FIG. 19 shows the interrelationship of an "A" type corner with a "B" type corner as is typical in the skeletal construction shown elsewhere in FIGS. 1-7, for example. FIG. 20 is also useful for showing the assembly process whereby channel member 44, for example, is inserted in an appropriate place on a corner member 92 by driving or otherwise moving the channel member 44 in the direction 59A as shown. The self-jigging characteristic of the interrelationship of the corner members with the appropriate channel members is thus emphasized. Of note with respect to the component parts shown in FIG. 19 is the beveled edges 104A and 106A on lip portions 104 and 106 of channel member 57, for example. These beveled edges abut complementarily beveled edges such as shown at 106A on lip 106 on channel member 44 when the corner assembly has been completed. Said in another way, surface X and surface Y meet when the corner 92 has been completely integrated with channel member 57 and channel member 44.

Figure 21:
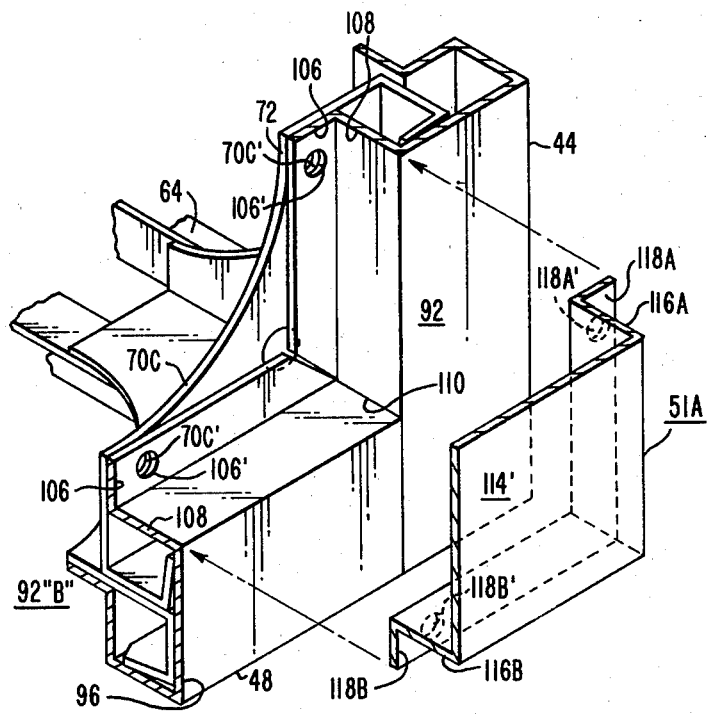
FIG. 21 shows a "B" type corner assembly with an "internal" metal clad panel.

Referring now to FIG. 21, a "B" type corner 92 of the type used at 5B or 5B' in FIG. 17 is shown for the purpose of depicting the construction interaction between the metal electrically conductive ground potential sheet 51A and the corner assembly 92. The designation 51A is utilized to distinguish from the designation 51 which is reserved for external as opposed to internal metal cladding. At the corner of the rectangular sheet 51A shown in FIG. 21, folded perpendicular spacer members are formed at 116A and 116B. Perpendicular lip members 118A and 118B respectively protrude outwardly from the spacer members 116A and 116B. Members 118A and 118B are generally parallel to surface 114 of the sheet 51A. Lip 118A fits snugly against lip 106 on channel member 44 while lip 118B fits snugly against lip 106 on channel member 48. As assembled, gusset member 70C may have holes or openings therein 70C'. Likewise, lip members 106 may have similar holes or openings 106' therein which align with holes or openings 70C' in member 70C. Finally, lip portions 118A and 118B may have holes or openings 118A' and 188B' therein which align with holes or openings 106' and 70C' when the internal panel 51A has been installed on the corner assembly 92. A bolt may be fed through the aligned holes 70C', 106' and 118' for securing of the panel 51A against the skeletal portion of the cabinet. It is to be noted that because the lips 118A and 118B extend outwardly from the region underneath or covered by the substantial panel portion 114 that access to either side of the bolt holes 70C', 106' and 118' may be easily had for securing the panel 51A to the corner assembly.

Figure 22:
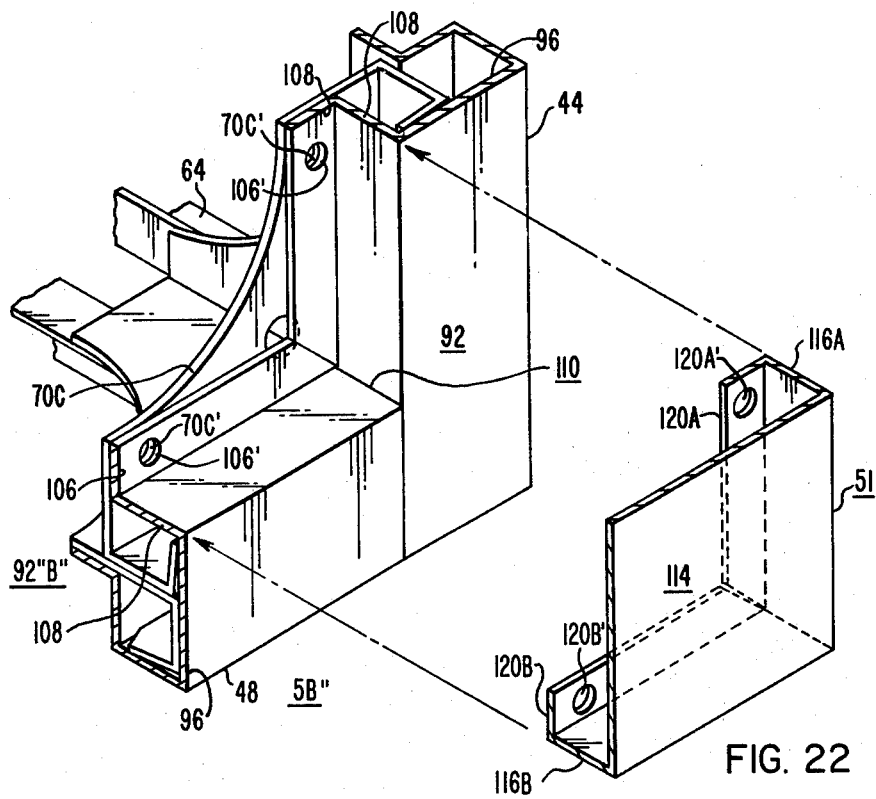
FIG. 22 shows a "B" type corner assembly with an "external" metal clad panel.

Referring now to FIG. 22 the corner assembly 92 shown in FIG. 20 is essentially duplicated in the same disposition as in FIG. 21. In this case, however, corner assembly 92 represents a 5B" type corner as viewed in FIG. 17. This means that corner 92 or the 5B" corner is the kind which requires an external panel 51. A panel of portion 51, for example, is depicted in FIG. 4. Because the panel 51 is an external panel, the lip members 120A and 120B which are shown extending from spacing members 116A and 116B, respectively, extend inwardly underneath panel portion 114' rather than outwardly as lip members 118A and 118B extend in FIG. 21. There are convenient holes or openings 120A' and 120B' respectively which align with holes or openings 106' and 70C' in appropriate cases in the corner assembly 92. In this case, however, bolt access to the aforementioned aligned holes may only be made from the inside or left portion of the corner assembly 92 as shown in FIG. 22. This generally means that a welded nut or the like must be disposed in alignment with the holes 120A' and 120B' on the internal portion of the lips 120A and 120B. Consequently, when external panel 51 is secured onto corner 92, external surfaces of spacer regions 116A and 116B abut surfaces 108 of channel members 44 and 48.

It is to be understood with respect to the embodiments of this invention that they may be applied for metal clad or metal enclosed switchgear. It is also to be understood that the construction features are not limited to switchgear apparatus, other apparatus may be housed in the cabinet. It is also to be understood that the particular cross-sectional arrangement of the channel members is not limiting. It is also to be understood that the various holes, openings and protrusions in the gusset members are non-limiting and not always shown in all embodiments or figures for simplicity of ilustration. It is also to be understood that the securing technique (welding) for fixing the corner is not limiting. For example, welds may also be placed opposite interface corners 86, 88 and 90 of the apparatus shown in FIG. 15. Also spot welds may be placed at interstices of surfaces 72 and 74; 72 and 76 of the joined gusset members 70A and 70B and 70C. Other securing techniques such as bolting or riveting may be used in appropriate places. It is also to be understood that the circle segment 73 on surface 72 is not limiting. It is also to be understood that when utilized in the switchgear apparatus, the skeletal arrangement which utilizes the corner constructions shown herein is not limited to use with circuit breaker apparatus nor with tandem vertically disposed circuit breaker apparatus. It is also to be understood that electrical aspects of the circuit breaker cabinets shown in FIGS. 1-3, for example, are not limiting. It is also to be understood that the construction features shown herein, though ideally used in rectangular polyhedron type construction is not limited thereto and that judicious change in the construction features of the gusset members may be utilized to form corner assemblies which are not comprised of members which are mutually 90° offset one from the other.

The apparatus embodying the teachings of this invention has many advantages. One advantage lies in the fact that only two corner members 71 ("A") and 92 ("B") are needed to form an 8-cornered skeletal arrangement. Furthermore, only one gusset construction 70 as shown in FIGS. 8, 9 and 10, for example, when utilized with three gusset members having the same construction features is necessary to form either of the corners 71 or 92. Another advantage lies in the fact that the combination of the corner assembly and the channel is self-jigging during the construction process. Another advantage lies in the fact that the corner assembly represent a significant structural member which is capable of bearing great static or dead weight and dynamic mechanical loads such as may be associated with switchgear apparatus. This is especially advantageous when utilized with vacuum circuit breaker apparatus where the dynamic loads of contact separation are often very high. Another advantage lies in the fact that the mechanical interconnection of the various gusset member when joined together to form a corner assembly when used with the channel members provides finish members which have enhanced electrical conductive properties as is desirable when formulating zero ground planes for metal clad switchgear. Another advantage lies in the fact that all of the aforementioned advantages may be had with a relatively simple member which is easily constructed and fabricated into a corner and thence into a skeletal arrangement.

What I claim is:

1. A corner support, comprising:
   three channel members each of which has an opening in the periphery thereof, and each of which is disposed generally perpendicular to the other two at an apex region; and
   three generally identical gusset members each of which has two resilient protruding portions thereon which are oriented at ninety degrees relative to each other, each said opening having one resilient portion on one of said gusset members extending therethrough only one of said openings in combination with only one resilient portion of another of said gusset members in said apex region to bear between internal surface regions of said channel member in a state of compression to align the remainder of each gusset member in a disposition which places all three gusset members in a corner arrangement in said apex region.

2. The combination as claimed in claim 1 wherein said channel members are elongated.

3. The combination as claimed in claim 2 wherein said openings are elongated.

4. Switchgear, comprising:
   circuit interrupting means for controlling an electrical circuit;
   skeleton support means disposed around said circuit interrupter means for assisting in isolating said circuit interrupter means from a predetermined region, said skeleton support means including three channel members each of which has an opening in the periphery thereof, and each of which is disposed generally perpendicular to the other two channel members at an apex region; and
   three generally identical gusset members each of which has two resilient protruding portions thereon which are oriented at ninety degrees relative to each other, each said opening having one resilient portion on one of said gusset members extending therethrough in combination with only one resilient portion of another of said gusset members in said apex region to bear between internal surface regions of said channel member in a state of compression to align the remainder of each gusset member in a disposition which places all three gusset members in a corner arrangement in said apex region.

5. The combination as claimed in claim 4 wherein said channel members are elongated.

6. The combination as claimed in claim 4 wherein said openings are elongated.

7. The combination as claimed in claim 4 including sheet means disposed on said channel means for further isolating said circuit interrupter means.

8. The combination as claimed in claim 7 wherein said sheet means is electrically conductive.

9. The combination as claimed in claim 8 wherein said sheet means comprises metal material.

10. The combination as claimed in claim 9 wherein said metal is maintained at electrical ground potential.

11. Electrical apparatus, comprising:
    electrical means for controlling an electrical circuit;
    skeleton support means disposed around said electrical means, said skeleton support means including three channel members each of which has an opening in the periphery thereof, and each of which is disposed generally peripendicular to he other two at an apex region; and three generally identical gusset members each of which has two resilient protruding portions thereon which are oriented at ninety degrees relative to each other, each said opening having one resilient portion of one of said gusset members extending therethrough in combination with only one resilient portion of another of said gusset members in said apex region to bear between internal surface regions of said channel member in a state of compression to align the remainder of each gusset member in a disposition which places all three gusset members in a corner arrangement in said apex region.

12. The combination as claimed in claim 11 wherein said channel members are elongated.

13. The combination as claimed in claim 12 wherein said openings are elongated.

* * * * *